United States Patent
Galfidi, Jr.

(10) Patent No.: US 6,240,671 B1
(45) Date of Patent: Jun. 5, 2001

(54) GAME CALLER KIT AND METHOD

(76) Inventor: Joe Galfidi, Jr., 8738 Tyler Blvd., Mentor, OH (US) 44060

( * ) Notice: Subject to any disclaimer, the term of this patent is extended or adjusted under 35 U.S.C. 154(b) by 0 days.

(21) Appl. No.: 09/296,692

(22) Filed: Apr. 20, 1999

Related U.S. Application Data

(63) Continuation-in-part of application No. 09/002,688, filed on Jan. 5, 1998, now Pat. No. 5,964,054, which is a continuation-in-part of application No. 08/637,502, filed on Apr. 25, 1996, now Pat. No. 5,704,154.

(51) Int. Cl.[7] ................................................ A63H 5/00
(52) U.S. Cl. .......................... 42/90; 446/193; 446/197; 446/207
(58) Field of Search .................... 446/193, 197, 446/207; 340/404.1; 42/90

(56) References Cited

U.S. PATENT DOCUMENTS

| | | | |
|---|---|---|---|
| 3,813,811 | * 6/1974 | Herter | 446/193 |
| 3,900,993 | * 8/1975 | Betters | 446/193 |
| 3,968,592 | * 7/1976 | Piper | 446/208 |
| 4,576,584 | * 3/1986 | Hill | 446/193 |
| 4,843,905 | * 7/1989 | Jean | 446/193 |
| 5,419,304 | * 5/1995 | Pardue | 446/397 |
| 5,549,498 | * 8/1996 | Kirby | 446/193 |

* cited by examiner

Primary Examiner—Stephen M. Johnson
(74) Attorney, Agent, or Firm—Joseph H. Taddeo

(57) ABSTRACT

This present invention relates to a kit for making a bellows operated game caller, for use in hunting wild game animals and waterfowl, and more particularly to a weapon mounted wild animal game caller. This weapon mounted wild animal game caller finds particular application in attracting game animals. The bellows operated caller constructed from the kit may be conveniently mounted and attached to an archery bow or to a hunting firearm. The game caller emits a grunting sound which is know to attract game animals, such as deer. The use of the grunter is very desirable for short range hunting making it the choice for many bow hunters. The activation of sound is accomplished by a novel air bladder that is filled with a resilient filamentous polyester type fiber. When mounted to an archers bow, it is easily operated with the hand even with a fully drawn bow.

22 Claims, 5 Drawing Sheets

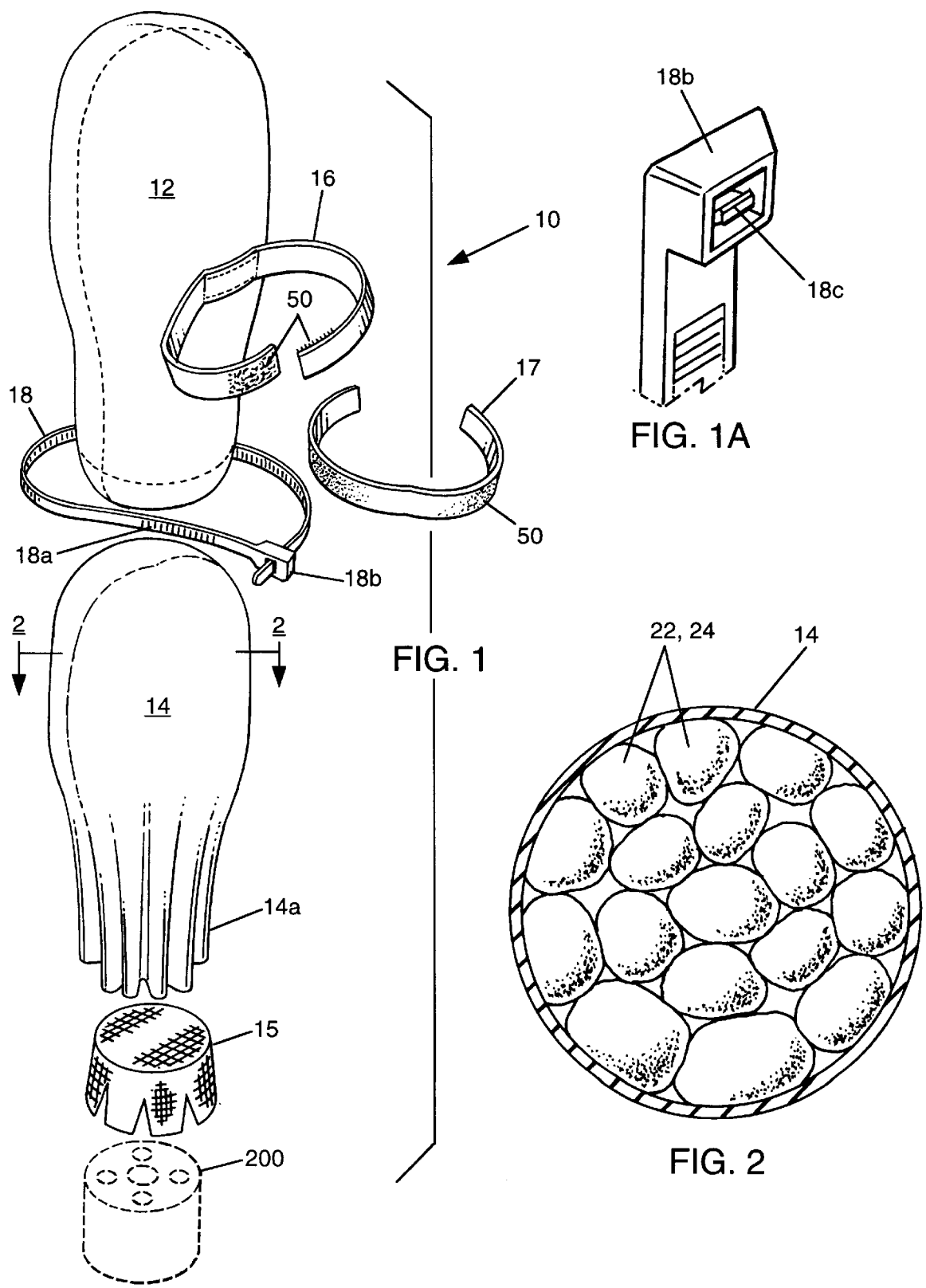

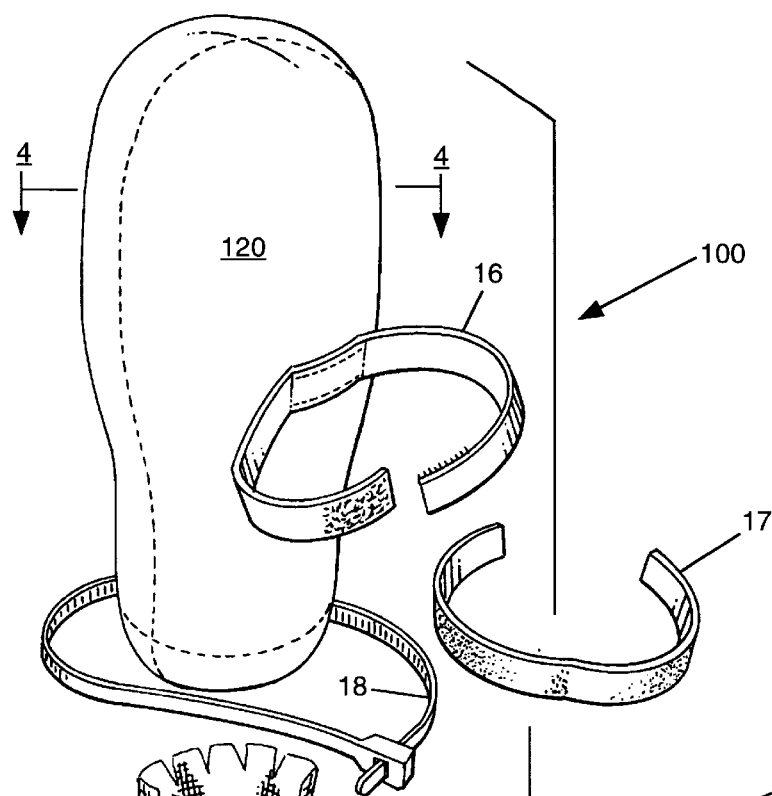
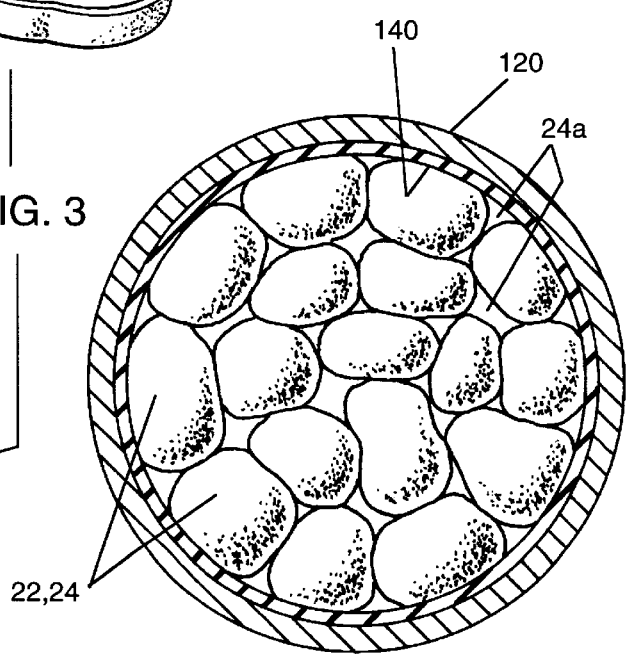

GAME CALLER KIT AND METHOD

REFERENCE TO PREVIOUSLY FILED APPLICATIONS

This application is a continuation-in-part of application Ser. No. 09/002,688, titled GAME CALLER, filed Jan. 5, 1998, issued as U.S. Pat. No. 5,964,054, which is a continuation-in-part of Ser. No. 08/637,502, titled A WEAPON MOUNTED GAME CALLER, filed Apr. 25, 1996, issued as U.S. Pat. No. 5,704,154, on Jan. 6, 1998. Benefit of the parent domestic applications is claimed under 35 USC 120 and 37 CFR §1.53.

FIELD OF THE INVENTION

This invention relates generally to air pressure operated game callers and weapon mounted callers, and more particularly to a kit containing the requisite components for making bellows operated game callers and conveniently mounting same to the weapon. The invention also relates to a method for making a game caller for inconspicuous operation using elements of the kit.

BACKGROUND OF THE INVENTION

Game callers may be employed to attract wild animals toward the hunter's stand or blind, to frighten them in the direction of other hunters, or to stop their motion for an alert mode that provides a stable target. There are many devices in use today to influence such movements of wild game animals. Typically, such devices produce sound to attract the wild game that include deer, moose, elk, wild fowl and waterfowl, or even turkeys. Rattling horns, both large and small are commonly used to create sounds that will attract deer.

Large horns have one major advantage—volume. They can be heard for long distances, or in thick cover. However, they also have disadvantages, mostly in carrying them around. Horns can be hung on a thong looped around the hunter's neck, but large antlers clatter on everything else that is carried from binoculars to a rifle. While most hunters own a horn or game caller that simulates a particular wildlife call as it exists in nature, they are presented with the problem that they cannot sound the caller while simultaneously aiming to fire at the prey. As such, many hunters seek conversion of their present caller to a bellows operated grunter or game call that is easier to use, particularly for beginners.

Experienced hunters realize that in order to bag game such as trophy deer, and prior to counting the antler points, long hours of patiently awaiting unpredictable wanderings of the animal, in inclement weather, early and late hours of the day, perserverance through hunger and thirst without movement, may be required. Such efforts should not be lost because the caller made the deer skittish and frightened the animal out of range.

Deer can hear small horns at surprising distances. The hunter need only to "tickle" the small horns several times to attract deer. Some bow hunters rattle an aluminum arrow against the wooden riser of the bow to call in bucks. Still other hunters use "rattling bags," small bags full of bone chips or other hard material, that simulate the light ticking of tines. They can be worked with one hand, with very little movement.

Still, many other hunters prefer a grunt call for close work, partially because it provides another type of sound. Unlike a rattling bag, a small grunt call doesn't even need one hand to work, leaving both hands free for your rifle or bow. Many calls are mouth-operated by blowing into them. Some calls require hunters to grunt vocally with their throats as they blow into the caller.

Sometimes it helps to provide other sound effects. Some of these devices are treadle operated by stepping on them with ones foot.

U.S. Pat. No. 4,237,615, granted Dec. 9, 1980, P. A. Bracknell, discloses a sight mount for an archery bow embodying a bracket to be mounted upon a bow.

U.S. Pat. No. 4,940,451, granted Jul. 10, 1990, to Leady provides an adjustable game call device having a trombone-like tuning member in sliding contact with a single point on a reed that the user positions axially to change the effective length of the reed, thereby varying the pitch of the sounds made by the caller.

U.S. Pat. No. 5,123,396, granted Jan. 23, 1992, to P. Shepley, et al., teaches of an accessory mount for a removable rigid securement of an accessory to an archery bow. The accessory mount provides for the mounting of a quiver to store more arrows, an overdraw mechanism or a sight.

U.S. Pat. No. 5,419,304, granted May 30, 1995, to R. K. Pardue, discloses a mounting jig that is removable and coupleable to a hunting bow, adapted to receive a removable turkey caller.

U.S. Pat. No. 5,431,590, granted Jul. 11, 1995, to F. M. Abbas, discloses an apparatus for calling game animals when the user is hunting with an archery bow. A game attracting call is sounded when the user either draws or blows air through a conduit which is connected to the bow mounted game caller.

There are many problems associated with using the apparatus described. Many of the devices require two hands to operate the device; some only one hand. There are calls that must be held in the mouth which can cause fatigue to the hunter holding the device. A foot operated apparatus is awkward at best, therefore does not find much application in deer hunting. Others may emit undesirable sounds at inappropriate times, thereby "spooking" the prey. The nature of the hunt requires that a hunter will be able to silently operate the caller device even with a fully drawn bow or while a gun is being aimed and ready.

What is needed is a small, lightweight, reliably operated caller that can be mounted to a hunting weapon, such as to a hunting bow or firearm, to attract deer and other wild game. Since most hunters own a mouth-operated grunter or other caller device, a kit with a bellows attachable to a grunter for hands-free caller operation would enhance opportunities to bring down large prey like deer or moose as well as small prey such as pheasant, turkeys, ducks and the like. In this regard, this invention fulfills this need.

SUMMARY OF THE INVENTION

The present invention is therefore directed to a kit containing the necessary elements for hunters to manufacture a bellows operated game caller using their own preferred grunter or other encased reed sounding device. The invention also discloses a method of manufacturing a pressure operated caller apparatus from an ordinary game caller generally owned by most hunters.

A first example of such pressure operated caller includes an air-filled, expansible bladder having a material jacket attachable to a grunter or other game caller device for use with the kit.

A second example of such a pressure operated caller provides an expansible bladder that is attachable to a grunter or other reed operated caller by use of the kit, wherein the bladder is filled with a resilient, interstitial material and surrounded by a material jacket, for rapid and silent recover of the bladder to its original shape after it is squeezed or compressed.

In another example of such a pressure operated caller, the bladder comprises a material stock that is coated with latex or other elastic to form an air-tight and expansible bladder that is likewise attachable to a grunter having an encased reed for use with the kit.

The kit is preferably provided with a means to secure the grunter or other game caller device in air-tight connection to the bladder; and further, with a means for removably attaching the entire caller system made from the kit to an archer's bow, rifle or other weapon.

The present invention is a kit to make an air pressure operated apparatus for calling game animals, such as deer, moose, elk, ducks and turkeys while hunting with a bow or a firearm. Its use is not limited to mounting or attaching to an archery bow, but can find application in mounting to a firearm as well.

The game attractor consists of a grunter or other game caller device that is made to be sounded by blowing air through a conduit, past a reed that vibrates, creating a simulated deer grunting sound or other game animal sound. Using a caller in this manner, which is attachable to the hunter's bow, crossbow or firearm, frees the arms and hands of the archer to sound the device while holding a drawn bow.

An expansible air bladder, that is preferably fabricated from a sheet vinyl material, is attached to the sounding device. This serves as source of air pressure that when squeezed or compressed, forces the air through the caller and across the reed. Internal to the jacketed bladder is a cushioning fill material comprised of a resilient filamentous polyester type fiber that restores the bladder to its original shape, while allowing air to be again silently filling the bladder for its next compression.

No extraneous noises are produced by the compression of the vinyl bladder or the resilient polyester fiber. Silent operation is essential for close work to prevent scaring away the prey. The vinyl air bladder is designed to be free from emitting noise, even if inadvertently rubbed by ones jacket or by a hunting shaft. The vinyl material selected is both soft and pliable and has a rapid recovery to its original shape even during the colder months.

Mouth operated game callers that function by blowing air across the reed have the deficiency that moisture from the breath may deposit on the reed and change the character of the sound emitted. In cold weather, the reed may start freezing with concomitant changes in the pitch and tone of the caller sounds, so the caller becomes impractical for its intended use. The reed may become completely frozen, so that it won't work at all. The bladder operated system of this invention eliminates these liabilities.

The air bladder driven game caller can be mounted near the central portion of the bow or on the stock or barrel of a firearm, where it can be operated by slight pressure exerted by the archer's hand. It can be detachably attached to a bow, a rifle or other weapon using a pressure sensitive adhesive, a hook and pile attachment system, such as Velcro, a cable tie, a belt or by a leather or plastic thong.

Thus, it is certainly advantageous to the hunter to have these implements stored together in one place or grouped together conveniently in the form of a kit for accessability.

It is therefore an object of this invention to provide a game caller kit attachable to a grunter call device or other wild game caller for sounding the device by use of an air pressure system.

It is another object of this invention to provide a game caller kit for attachment to a grunter or other wild game caller device for an air driven system, wherein the air bladder is filled with a highly resilient, rapid recovery polyester fiber.

It is still another object of this invention to provide for a game caller kit for making a grunter or wild game caller that is driven by an air bladder system, said air bladder being comprised of materials free from inadvertently generating any extraneous sounds that are distracting to the prey.

Yet another object of the invention is to provide a game caller kit having a means for securing the grunter to the bladder with an air-tight connection.

Yet, it is still another object of this invention to provide a game caller kit for a wild game caller system that is readily attachable to an archery bow.

Further, it is another object of this invention to provide for a game caller kit for making a wild game caller system that is readily attached to a hunter's rifle or firearm.

A further object is the provision of a bellows operated game caller that eliminates the potential for moisture deposits consequent to breathing on the reed, that can freeze the reed in cold weather, change the character of the sound emitted from the caller, and render the caller impractical or inoperable.

Lastly, it is another object of this invention to provide for a game caller kit to make a wild game caller system that is easily operated by the bowman even with the bow being fully drawn.

The present invention is also directed to a method of manufacture and assembly of a pressure operated game caller, that is attachable to a weapon, freeing the hunter's hands, yet can be sounded while the weapon is being aimed and fired.

BRIEF DESCRIPTION OF THE DRAWINGS

FIG. 1 is an exploded perspective view of the kit of the present invention in its preferable bellows form;

FIG. 1A is an exploded perspective showing the cable tie buckle;

FIG. 2 is a sectional view taken through section 2—2 of FIG. 1;

FIG. 3 is an exploded perspective view of another embodiment of the kit of the invention;

FIG. 4 is a sectional view taken through section 4—4 on FIG. 3;

DETAILED DESCRIPTION OF THE PREFERRED EMBODIMENT

Figure 5:
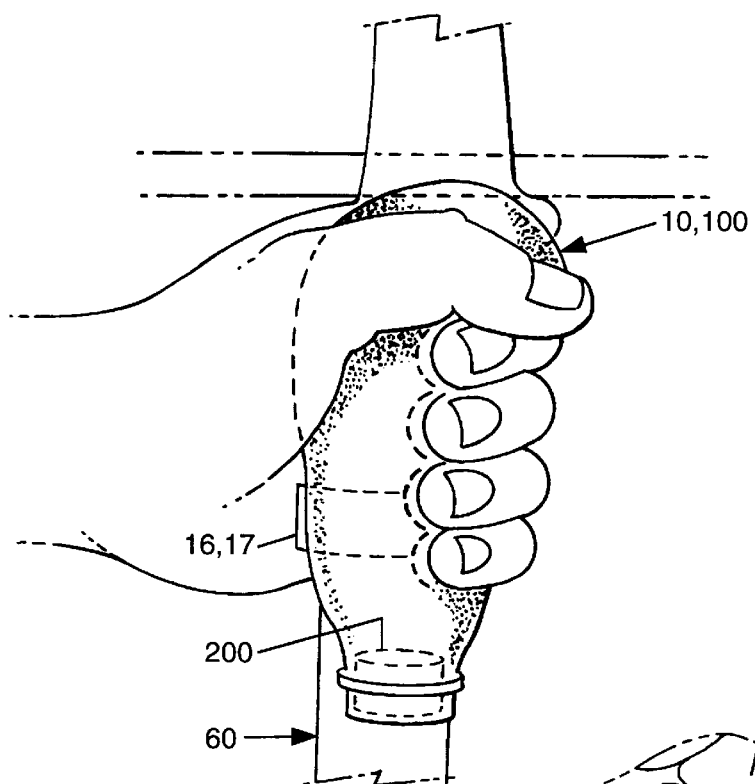
FIG. 5 is a partial right-side view showing the bladder with game caller installed on an archery bow.

Presently available grunters are designed to be sounded by blowing air or by drawing air across the reed found internal to the nylon grunter. Present callers retained on a hunter's neck or jacket require movements with potential rustling noises for use. This type of design is awkward and cumbersome especially to the hunter that is using an archery bow to hunt with. Grunters which are clamped by a hunter's teeth may interfere with aiming and firing techniques. Even though the bowman's hands are free to draw the bow, it is quite fatiguing to hold a grunter in one's mouth by clenching ones' teeth.

FIG. 1 is an illustrative example of a game caller kit 10 comprising an elastic material cover or bellows casing 12 with an expansible, air-tight bladder 14 insertable therein. The bladder may be simply an air pressure container or elastic bulb of sufficient resilience for return to its original shape following compression. However, FIG. 1 in conjunction with FIG. 2 indicate that the bladder is preferably filled with a cushioning interstitial material or fill 22,24 that is comprised of a resilient filamentous polyester type fibrous matter for restoring the bladder to its original shape. FIG. 2, a sectional view taken through section 2—2 of FIG. 1, discloses the fill 22,24 that is encapsulated in the bladder 14.

A cloth mesh or screen 15 positioned at the air intake or spout 14a of the bladder is designed for retention of fiber material and to prevent clogging the caller device 200 with fill material 22,24. The cloth mesh 15 may serve as a downward facing screen for protection of the grunter or caller 200. Or, the cloth screen 15 may be positioned as an upward directed fill retainer as seen in FIG. 3.

The lack of definition or amorphous shape of the spout 14a enables interfitting with any of the various grunters and sounding devices currently used by hunters. Meanwhile, a grunter or other game caller device 200, having an encased reed 32, (FIG. 6), is situated forward of the screen 15. Similar grunters and game callers of various types are generally owned by or readily available to hunters and the kit 10 is adapted for conformity to any air-driven grunter or caller device.

The ribbed sizing strap or cable tie 18, with ribs 18a on both its interior and exterior surfaces, is adapted for gripping the casing and its bladder with an air-tight compression fit on the outer surface of the nylon grunter 200. This is achieved when the strap or cabletie 18, which is insertable into a buckle portion 18b with teeth 18c, shown in FIG. 1A, is tightened on the casing and bladder spout around the grunter, whereby the teeth clamp the ribs to anchor the strap end. Meanwhile, strap portions 16,17, laden with Velcro 50, provide a means for mounting the air-driven caller device on the bow 60 or the stock or barrel of a weapon.

As shown in FIG. 1, the game caller kit includes various alternatives for detachably mounting the game caller system to a weapon including a Velcro laden strap 17, cable tie 18, thong 33, hook and loop securing arrangement 34, a pressure sensitive adhesive 35, belt 36, or a two-sided tape 37.

Referring now to FIGS. 3 and 4, the game caller kit 100 is shown in its preferred embodiment, wherein the bellows casing and the bladder consist of a single piece coated material. The invention still uses the expansible air bladder 120 as an air pressure source to operate the grunter or caller device 200. The air bladder comprises the exterior jacket or cover portion 120 which is made of a soft pliable vinyl material, the interior surface of which comprises a latex undercoating. The bladder 120 is preferably filled with a material 22,24 which is shredded or fragmented, so that there are interstitial air-filled spaces 24a between the shreds. More preferably, that material is a resilient filamentous polyester type fiber. This material having interstices 24a between the fibers is selected to have a rapid recovery of shape after once being squeezed or compressed. A further selection criterion for the air bladder and the polyester fiber therein is that they emit no undesirable or extraneous noises when in use.

Figure 6:
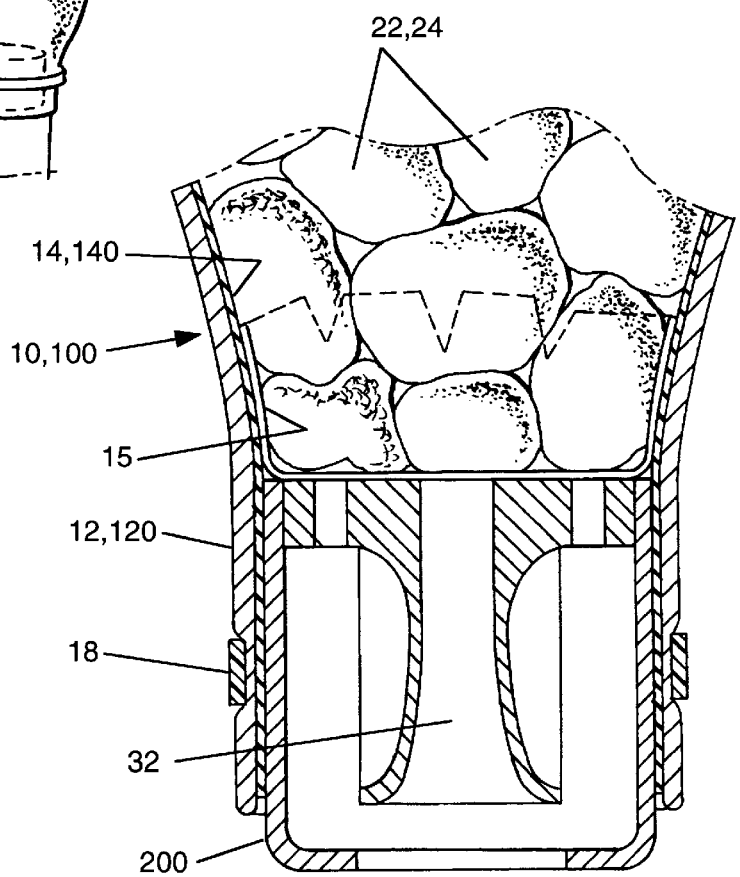
FIG. 6 is a partial sectional view showing the GAME CALLER attached to a reed grunter.

As shown in FIGS. 5 and 6, when the air bladder is controllably depressed, as a bowman would do by exerting a force with the hand, there is a passage of air through the nylon grunter 200. Internal to the grunter is a reed 32 which is set into vibration when a volume of air passes across it. It is the size and shape of the vibrating reed that gives it the grunting capability when short bursts of air are passed through it.

The sound that is created by the vibrating reed may then pass through a flexible conduit or resonator, (not shown), that gives an added dimension to the authenticity of the grunting sound.

Upon the release of pressure on the air bladder, there is a rapid recovery to the shape of the bladder. As the original shape is restored, air is now drawn in through the grunter or other game caller, silently passing through the nylon grunter 200, into the now fully expanded air bladder. The bladder may include slits, (not shown), cut therethrough to increase the rate at which the bladder recovers and refills with air.

Figure 7:
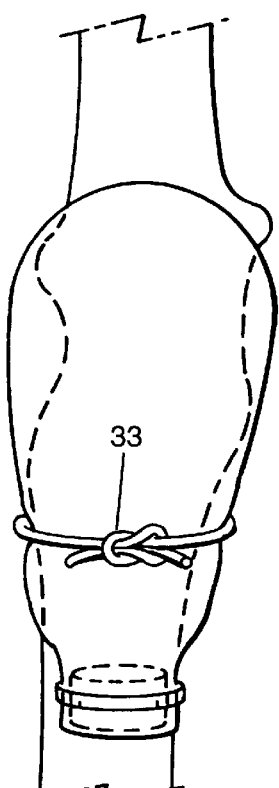
FIG. 7 is a partial right-side view showing the bladder and game caller mounted on a bow using a thong.
Figure 8:
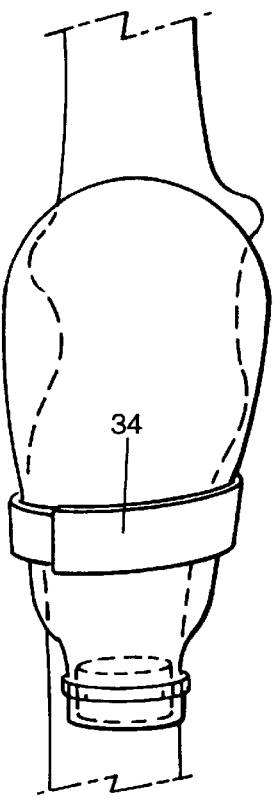
FIG. 8 is a partial right side view showing the bladder and game caller mounted on the bow using a strap with hook and loop material.

The air bladder and grunter can be attached to an archery bow by thong 33, (See FIGS. 1,3 and 7), tether if to the bow or by securing it with a hook and pile strap 34 as in FIGS. 1, 3 and 8. The bladder strap 16 can be adhered or sewn to the bladder 14,140, (FIGS. 1 and 3), for detachabe attachment to the weapon by use of strap 16, that extends around the bow or firearm. The strap or belt 16 and extension strap 17 are laden with Velcro 50 for mating the strap ends to mount the air driven grunter on the weapon with the desired tightness and security.

In FIG. 5, there is shown a partial side view of an archery bow 60 with the air bladder and an air-driven caller or grunter 200 mounted on it. The game caller kit assembly 10,100 is mounted in a convenient position so that it can be easily operated even with a fully drawn bow.

FIG. 6 is a partial section view showing the game caller kit 100 attached in an air-tight configuration to a grunter using ribbed strap or cable tie 18.

Those skilled in the art will recognize that many different shapes of bellows can be provided, which include spherical or pear shaped elastic bulbs, an oblong bellows, or other shape congruent with the weapon grip configuration or the grip of the hunter's hand. This would make the bellows a less conspicuous component on the weapon stock.

Figure 9:
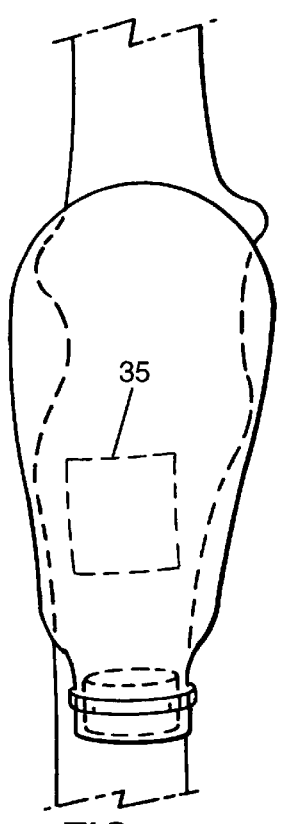
FIG. 9 is a partial right side view showing the bladder and game caller mounted on the weapon using a PSA, pressure sensitive adhesive material.
Figure 10:
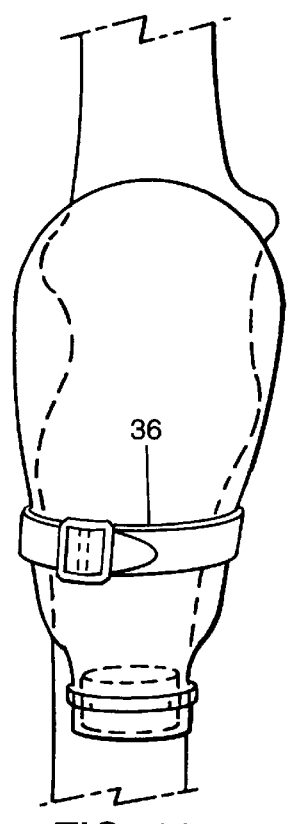
FIG. 10 is a partial right side view showing the bladder and game caller mounted on the weapon using a belt.
Figure 11:
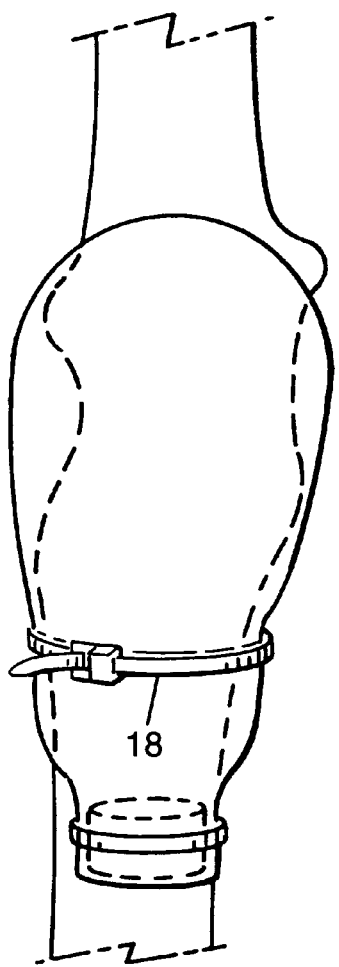
FIG. 11 is a partial right side view showing the bladder and game caller mounted on the weapon using a cable tie.

When in use, a hunter can readily install one grunter or game caller in substitution for another in the bellows operated system of the kit. Meanwhile, the bellows operated game caller can easily and quickly be attached, detached and reinstalled on the weapon, using a plurality of alternatives in the kit, wherein the alternatives consist of thongs 33 in FIG. 7, a hook and loop securing arrangement 34 in FIG. 8, a pressure sensitive adhesive 35 in FIG. 9, a belt 36 as in FIG. 10, or a cable tie 18 as shown in FIG. 11.

Figure 12:
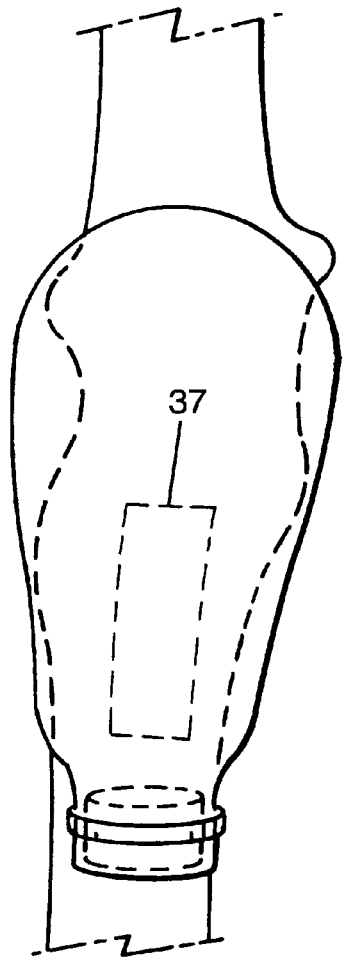
FIG. 12 is a perspective view showing that the bladder ready for mounting on the bow using a two-sided tape applied on the bow and the bladder.

FIG. 12 is a perspective view showing that the bladder ready for mounting on the bow using a two-sided tape 37 applied on the bow and the bladder.

Based upon the foregoing, the kit of the invention provides all materials necessary to create a bellows operated game caller, that is releasably secured to the weapon, allowing the hunter to tailor make a pressure operated grunter or caller using his own game call, while located in a hunter's stand or blind. Providing the kit with a variety of different Velcro laden straps 16,17, plus attachment means 18, 33, 34, 35, 36, and 37, allows the hunter to create a bellows operated caller, by interchanging one game caller for another in the bellows system provided by the kit, that produces a call particular to the wild game sought by the hunter. Further, assembling the components required for a bellows operated caller in the form of a kit allows easy and convenient storage of the game caller kit between uses, and allows a wide variety of grunters or game caller devices to be integrated easily with components of kit.

There may be other improvements, modifications and embodiments that will become apparent to one of ordinary skill in the art upon review of this disclosure. As such, these improvements, modifications and embodiments are considered to be within the scope of this invention as defined in the ensuing claims and equivalents thereof.

I claim:

1. A method of making a weapon mounted bellows operated game caller system, using a kit, said method comprising the steps of:

filling a bellows having a spout and an interstitial fill material;

selecting an air pressure game caller;

fitting the caller in the bellows spout;

attaching the bellows to the selected game caller with an air-tight fit; and, mounting the game caller system in a position on the weapon, whereby the caller can be sounded while the weapon is being aimed and fired.

2. The method of claim 1, wherein the filling a bellows step includes the step of inserting a screen positioned at the bladder spout for retention of the fill material and to prevent clogging of the game caller.

3. The method according to claim 2, wherein the attaching the bellows step is achieved by, tightening a sizing strap for attachment of the bladder spout to an outer surface of the caller with an air-tight compression fit.

4. The method according to claim 3, wherein the mounting the game caller step is carried out by, securing the caller system to the weapon using a detachable attachment comprising a plurality of alternatives selected from the group consisting of a pressure sensitive adhesive, a hook and loop securing arrangement, Velcro, a cable tie, a belt, and thongs.

5. The method of claim 4, wherein the weapon comprises an archer's bow having a central portion; and, said step of securing the caller system to the weapon includes the step of:

adjusting the bellows and caller to a position on the bow wherein the bellows can be compressed by the hunter for sounding the caller while simultaneously drawing, aiming and firing.

6. A kit for hunters to make air pressure operated game caller using their own preferred encased reed sounding device, that eliminates the potential for moisture deposits on the reed and freezing thereof, the kit comprising:

an expansible air bladder including a spout and containing a resilient shredded material to provide interstitial air-filled spaces between the shreds and rapid recovery of the bladder to its original shape following a compression thereof;

a connector device for making an air-tight connection of the bladder with the hunter's sounding device chosen to provide a pre-selected game call; and, a mounting adapter, for detachably mounting the bladder and sounding device to a weapon for quick release, removal of the sounding device and re-attachment of the bladder with a substituted sounding device to the weapon.

7. The kit as recited in claim 6, wherein the bladder in air-tight connection with the sounding device are detachably mounted on the weapon in a position, whereby the hunter can simultaneously beam the pre-selected game call, while aiming and firing the weapon.

8. A kit for making a bellows operated game caller system, comprising:

an expansible bellows with a spout that fits over a game caller;

means for attaching the bellows spout to the game caller with an air-tight fit for forming the bellows operated game caller system;

means for mounting the bellows operated game caller system to a weapon; and, an interstitial fill material within the bellows for restoring the bellows to its original air-filled shape following a compression.

9. A kit as recited in claim 8, wherein, the fill material comprises a resilient filamentous polyester fiber, that emits no frictional, extraneous noises upon the compression thereof.

10. A kit as recited in claim 9, further comprising, a screen positioned at the bellows spout for retention of the fill material and to prevent clogging of the game caller.

11. A kit as recited in claim 10, the means for attaching further comprising, a sizing strap having ribs on its interior and exterior surfaces and including a buckle portion having teeth for tightening the bellows with an air-tight compression fit on the caller, when the strap is tightened and the buckle teeth clamp the ribs to anchor the strap in a tightened position.

12. A kit as recited in claim 11, wherein, the weapon comprises an archer's bow with a central portion, the bellows operated game caller system mounted at the central portion, for operation of the caller without extraneous noises while the bow is drawn, aimed and fired.

13. A kit as recited in claim 12, the means for mounting comprising a strap portion associated with the bellows.

14. A kit as recited in claim 13, wherein, said strap portion is laden with a pressure sensitive material for facility in detachably attaching the bellows operated game caller system to the weapon.

15. A kit as recited in claim 14, wherein, said bellows comprising an elastic material cover with an expansible air-tight bladder inserted therein.

16. A kit as recited in claim 14, further comprising, said bellows comprising an expansible bladder having an inner surface coated with an air-tight material undercoating.

17. A kit according to claim 16, the air-tight material undercoating comprising latex.

18. A weapon mounted, bellows operated, game caller system formed from a kit including an at least one game caller, an expansible bellows having an interstitial fill material within the bellows, a spout with a sizing strap; means for attaching the bellows spout to the at least one game caller with an air-tight fit, and means for mounting the game caller system to a weapon, said game caller system formed by the steps of:

fitting a desired caller, selected from the at least one game caller, in the bellows spout;

attaching the bellows to the selected game caller with an air-tight fit;

mounting the game caller system in a position on the weapon whereby the caller can be sounded while the weapon is being aimed and fired.

19. The game caller system according to claim 18, said bellows further comprising a screen positioned at the bladder spout for retention of the fill material and to prevent clogging of the game caller.

20. The game caller system according to claim 19, wherein the attaching the bellows step is achieved by, tightening the sizing strap for attachment of the bladder spout to the caller with an air-tight compression fit.

21. The game caller system according to claim 20, wherein the mounting the game caller step is carried out by, securing the caller system to the weapon using a detachable attachment comprising a plurality of alternatives selected from the group consisting of a pressure sensitive adhesive, a hook and loop securing arrangement, Velcro, a cable tie, a belt, and thongs.

22. The game caller system of claim 21, wherein the weapon comprises an archer's bow having a central portion; and, said step of securing the caller system to the weapon includes the step of:

adjusting the bellows and caller near the central portion of the bow whereby the bellows can be compressed by the hunter for sounding the caller while simultaneously drawing, aiming and firing.

\* \* \* \* \*